(12) United States Patent
Harris et al.

(10) Patent No.: US 9,717,992 B2
(45) Date of Patent: Aug. 1, 2017

(54) INVALIDATING NETWORK DEVICES WITH ILLICIT PERIPHERALS

(71) Applicant: SONY INTERACTIVE ENTERTAINMENT AMERICA LLC, San Mateo, CA (US)

(72) Inventors: Adam P. Harris, San Diego, CA (US); Steve C. Schneider, San Diego, CA (US)

(73) Assignee: SONY INTERACTIVE ENTERTAINMENT AMERICA LLC, San Mateo, CA (US)

(*) Notice: Subject to any disclaimer, the term of this patent is extended or adjusted under 35 U.S.C. 154(b) by 24 days.

(21) Appl. No.: 14/313,553

(22) Filed: Jun. 24, 2014

(65) Prior Publication Data

US 2014/0309024 A1    Oct. 16, 2014

Related U.S. Application Data

(63) Continuation of application No. 11/415,881, filed on May 1, 2006, now Pat. No. 8,771,061, which is a
(Continued)

(51) Int. Cl.
*A63F 9/24*      (2006.01)
*A63F 13/73*    (2014.01)
(Continued)

(52) U.S. Cl.
CPC .............. *A63F 13/73* (2014.09); *A63F 13/31* (2014.09); *A63F 13/71* (2014.09); *A63F 13/77* (2014.09);
(Continued)

(58) Field of Classification Search
None
See application file for complete search history.

(56) References Cited

U.S. PATENT DOCUMENTS 5,638,446 A    6/1997  Rubin
5,768,382 A    6/1998  Schneier
(Continued)

FOREIGN PATENT DOCUMENTS

CN        1290437 A        4/2001
CN       103429302       12/2013
(Continued)

OTHER PUBLICATIONS

Extended European Search Report for EP 07753269.5 mailed Oct. 6, 2011.
(Continued)

*Primary Examiner* — Paul A D'Agostino
(74) *Attorney, Agent, or Firm* — Polsinelli LLP (57) ABSTRACT

A system and method for passively validating network game users is provided. Data indicative of game behavior and actions at one or more nodes interacting with a network game in a network game community are monitored. The data is evaluated to determine whether the one or more nodes are adhering to one or more rules associated with the network game. Data indicative of illicit game behavior may trigger various responses including invalidation of the node engaged in the illicit behavior. Alternatively, a query may be generated to further identify the nature and/or actual existence of illicit behavior at the node. Monitoring of game data may occur at a server, a peer, as part of a peer group or combinations thereof, which may be based on routine schedule or part of constant game behavior monitoring.

20 Claims, 5 Drawing Sheets

Related U.S. Application Data continuation-in-part of application No. 11/386,039, filed on Mar. 20, 2006, now Pat. No. 7,480,656.

(51) Int. Cl.
*A63F 13/77* (2014.01)
*A63F 13/71* (2014.01)
*A63F 13/31* (2014.01)

(52) U.S. Cl.
CPC . *A63F 2300/1031* (2013.01); *A63F 2300/807* (2013.01)

(56) References Cited

U.S. PATENT DOCUMENTS

| | | | |
|---|---|---|---|
| 5,892,900 A | 4/1999 | Ginter et al. | |
| 5,910,987 A | 6/1999 | Ginter et al. | |
| 5,915,019 A | 6/1999 | Ginter et al. | |
| 5,917,912 A | 6/1999 | Ginter et al. | |
| 5,949,876 A | 9/1999 | Ginter et al. | |
| 5,970,143 A * | 10/1999 | Schneier et al. | 713/181 |
| 5,982,891 A | 11/1999 | Ginter et al. | |
| 6,021,219 A | 2/2000 | Andersson et al. | |
| 6,134,237 A | 10/2000 | Brailean et al. | |
| 6,165,072 A | 12/2000 | Davis | |
| 6,237,786 B1 | 5/2001 | Ginter et al. | |
| 6,253,193 B1 | 6/2001 | Ginter et al. | |
| 6,363,488 B1 | 3/2002 | Ginter et al. | |
| 6,389,402 B1 | 5/2002 | Ginter et al. | |
| 6,405,104 B1 | 6/2002 | Dougherty | |
| 6,427,140 B1 | 7/2002 | Ginter et al. | |
| 6,640,304 B2 | 10/2003 | Ginter et al. | |
| 6,658,568 B1 | 12/2003 | Ginter et al. | |
| 6,779,004 B1 | 8/2004 | Zintel | |
| 6,829,634 B1 | 12/2004 | Holt et al. | |
| 6,850,252 B1 | 2/2005 | Hoffberg | |
| 6,850,909 B1 | 2/2005 | Aiello et al. | |
| 6,865,735 B1 | 3/2005 | Sirer et al. | |
| 6,948,070 B1 | 9/2005 | Ginter et al. | |
| 7,043,641 B1 | 5/2006 | Martinek et al. | |
| 7,051,212 B2 | 5/2006 | Ginter et al. | |
| 7,069,451 B1 | 6/2006 | Ginter et al. | |
| 7,076,652 B2 | 7/2006 | Ginter et al. | |
| 7,168,089 B2 | 1/2007 | Nguyen et al. | |
| 7,169,050 B1 | 1/2007 | Tyler | |
| 7,288,027 B2 | 10/2007 | Overton | |
| 7,367,888 B1 | 5/2008 | Chen | |
| 7,392,422 B2 | 6/2008 | Van Datta et al. | |
| 7,480,656 B2 | 1/2009 | Harris et al. | |
| 7,515,718 B2 | 4/2009 | Nguyen | |
| 7,517,282 B1 | 4/2009 | Pryor | |
| 7,543,152 B2 | 6/2009 | Hamalainen et al. | |
| 7,584,154 B1 | 9/2009 | Chen et al. | |
| 7,610,505 B2 | 10/2009 | Datta | |
| 7,695,370 B2 | 4/2010 | Liu | |
| 7,720,962 B2 | 5/2010 | Gupta | |
| 7,753,795 B2 | 7/2010 | Harris et al. | |
| 7,780,526 B2 | 8/2010 | Nguyen | |
| 7,801,957 B2 | 9/2010 | Guo | |
| 8,032,502 B2 | 10/2011 | Harris et al. | |
| 8,033,913 B2 | 10/2011 | Cockerille et al. | |
| 8,057,298 B2 | 11/2011 | Nguyen et al. | |
| 8,065,394 B2 | 11/2011 | Crowder et al. | |
| 8,115,765 B2 | 2/2012 | Sommers | |
| 8,137,200 B2 | 3/2012 | Kelly et al. | |
| 8,251,810 B2 | 8/2012 | Van Luchene | |
| 8,622,837 B2 | 1/2014 | Harris | |
| 8,626,710 B2 | 1/2014 | Harris | |
| 8,715,072 B2 | 5/2014 | Harris | |
| 8,972,364 B2 | 3/2015 | Harris | |
| 9,526,990 B2 | 12/2016 | Harris | |
| 2001/0044339 A1 | 11/2001 | Cordero et al. | |
| 2002/0075805 A1 | 6/2002 | Gupta et al. | |
| 2002/0078464 A1 | 6/2002 | Dravida et al. | |
| 2002/0085552 A1 | 7/2002 | Tandom | |
| 2002/0184310 A1 | 12/2002 | Traversat et al. | |
| 2003/0027639 A1 | 2/2003 | Peterson et al. | |
| 2003/0070070 A1 | 4/2003 | Yeager et al. | |
| 2003/0078103 A1 | 4/2003 | LeMay et al. | |
| 2003/0137110 A1 | 7/2003 | Huard et al. | |
| 2003/0176218 A1 | 9/2003 | LeMay et al. | |
| 2003/0177347 A1 | 9/2003 | Schneier et al. | |
| 2003/0195025 A1 | 10/2003 | Hill | |
| 2003/0216962 A1 | 11/2003 | Heller et al. | |
| 2003/0226007 A1 | 12/2003 | Olson et al. | |
| 2003/0229789 A1 | 12/2003 | Morais et al. | |
| 2004/0093372 A1 | 5/2004 | Chen et al. | |
| 2004/0127277 A1 | 7/2004 | Walker et al. | |
| 2004/0166942 A1 | 8/2004 | Muir | |
| 2004/0193919 A1 | 9/2004 | Dabbish et al. | |
| 2004/0242321 A1 | 12/2004 | Overton | |
| 2004/0259633 A1 | 12/2004 | Gentles et al. | |
| 2005/0086288 A1 | 4/2005 | Datta et al. | |
| 2005/0086369 A1 | 4/2005 | Mai et al. | |
| 2005/0101374 A1 | 5/2005 | Acres | |
| 2006/0036874 A1* | 2/2006 | Cockerille | G06F 21/52 713/187 |
| 2006/0040741 A1* | 2/2006 | Griswold | G07F 17/32 463/40 |
| 2006/0063590 A1 | 3/2006 | Abassi et al. | |
| 2006/0089200 A1 | 4/2006 | Twerdahl | |
| 2006/0100010 A1 | 5/2006 | Gatto et al. | |
| 2006/0160621 A1* | 7/2006 | Rowe | G07F 17/32 463/42 |
| 2006/0190281 A1 | 8/2006 | Kott et al. | |
| 2006/0221825 A1 | 10/2006 | Okano | |
| 2007/0066398 A1 | 3/2007 | Rowan | |
| 2007/0210929 A1 | 9/2007 | Sabata et al. | |
| 2007/0218996 A1 | 9/2007 | Harris et al. | |
| 2007/0238528 A1* | 10/2007 | Harris | A63F 13/12 463/42 |
| 2007/0276521 A1 | 11/2007 | Harris et al. | |
| 2007/0294399 A1 | 12/2007 | Grossner et al. | |
| 2008/0207319 A1* | 8/2008 | Okada | 463/31 |
| 2008/0305869 A1 | 12/2008 | Konforty et al. | |
| 2008/0313346 A1 | 12/2008 | Kujawa et al. | |
| 2009/0113515 A1 | 4/2009 | Zalewski | |
| 2010/0029370 A1 | 2/2010 | Robinson et al. | |
| 2010/0197405 A1 | 8/2010 | Douceur et al. | |
| 2011/0269547 A1 | 11/2011 | Harris et al. | |
| 2012/0088585 A1 | 4/2012 | Harris et al. | |
| 2012/0108327 A1 | 5/2012 | Tandon | |
| 2014/0100027 A1 | 4/2014 | Harris | |
| 2014/0187316 A1 | 7/2014 | Harris | |

FOREIGN PATENT DOCUMENTS

| | | |
|---|---|---|
| JP | 2000-040045 | 2/2000 |
| JP | 2004-021549 | 1/2004 |
| JP | 2004-164640 | 6/2004 |
| JP | 2006-006473 | 1/2006 |
| JP | 2014-502175 | 1/2014 |
| WO | WO 2007/109130 | 9/2007 |
| WO | WO 2012/060900 | 5/2012 |

OTHER PUBLICATIONS

U.S. Appl. No. 12/917,642 Office Action mailed Oct. 22, 2015.
U.S. Appl. No. 12/917,642 Office Action mailed Dec. 5, 2014.
Ferretti et al., Stefano; "AC/DC: an Algorithm for Cheating Detection by Cheating", Proceedings of the 2006 International Workshop on Network and Operating Systems Support for Digital Audio and Video, NOSSDAV 2006. Jan. 1, 2006.
Ferretti et al., Stefano; "Game Time Modelling for Cheating Detection in P2P MOGs: a Case Study with a Fast Rate Cheat." Proceedings of 5th ACM Sigcomm Workshop on Network and System Support for Games, NETGAMES 2006, Jan. 1, 2006.
Mizrak et al., Alper T.; "Detecting Malicious Packet Losses", IEEE Transactions on Parallel and Distributed Systems, vol. 20, No. 2, Feb. 1, 2009.
"RTP, Real-Time Transport Protocol", http://www.networksorcery.com/enp/protocol/rtp.htm Date of download: Apr. 22, 2015.

(56) References Cited

OTHER PUBLICATIONS

Extended European Search Report for EP 11838378.5 mailed May 4, 2015.
Japanese Application No. 2013-537662 Notification of Reasons for Refusal Mar. 31, 2015.
U.S. Appl. No. 12/917,642 Final Office Action mailed May 18, 2015.
Chinese Application No. 201180063916.6 Office Action dated Jan. 6, 2015.
"First Pit and Heartfelt . . . about Game Zone cheaters [Archive]—Straight Dope Message Board," Jun. 2, 2003, Straight Dope, available at ,http://board.straightdope.com/sdmb/archive/index.php/t-188189.html.>.
Bjorn et al., Christoph, "Punkbuster for Server Administrators—America's Army Edition." Even Balance, Inc. <http://www.punkbuster.com/publications/aa-ad/index.htm> Nov. 11, 2004.
Cronin et al., Eric, "Cheat-Proofing Dead Reckoned Multiplayer Games (Extended Abstract)." In Proc. ADCOG 2003. <http://warriors.eecs.umich.edu/games/papers/adcog03-cheat.pdf> Jan. 2003.
Delap et al., Margaret, "Is Runtime Verification Applicable to Cheat Detection?" SIGCOMM '04 Workshops. <http://conferences.sigcomm.org/sigcomm/2004/workshop_papers/net606-delap1.pdf> Aug. 30 & Sep. 3, 2004.
Dunsmore, Stuart "Punkbuster Server Manual (beta) version 0.947." Even Balance, Inc. <http://www.web.archive.org/web/20020211181729/www.evenbalance.com/pbmanual/serverman.htm> 2000-2001.
Emons, Winand "Escalating Penalties for Repeat Offenders," Oct. 2003.
Gauthier et al, Paul, "Dealing with Cheaters in Anonymous Peer-to-Peer Networks." University of Washington, Technical Report Apr. 1, 2003. Jan. 15, 2004.
Lomont, Chris "Secure Channel Communication," 2009, retreived from <http://www.lomont.org/Math/Papers/2009/Secure%20Channel%20Communication.pdf.
Rojas, Peter "Microsoft Locks Modded Xboxes out of Xbox Live," Nov. 11, 2004, Engadget.
World of Warcraft, "Game Manual." Blizzard Entertainment. <http://replacementdocs.com/download.php?view.2488> Oct. 27, 2004.
World of Warcraft, "Terms of Use." Blizzard Entertainment. <http://web.archive.org/web/20050304021845/www.worldofwarcraft.com/legal/termsofuse.html> Oct. 27, 2004.
PCT/US11/35587, International Search Report and Written Opinion mailed Aug. 9, 2011.
PCT/US07/006628, International Search Report and Written Opinion mailed Sep. 12, 2008.
U.S. Appl. No. 11/386,039 Office Action mailed Mar. 17, 2008.
U.S. Appl. No. 11/415,881, Office Action mailed Mar. 6, 2014.
U.S. Appl. No. 11/415,881 Final Office Action mailed Dec. 8, 2009.
U.S. Appl. No. 11/415,881, Office Action mailed Jun. 3, 2009.
U.S. Appl. No. 11/415,881 Final Office Action mailed Oct. 15, 2008.
U.S. Appl. No. 11/415,881 Office Action mailed Feb. 22, 2008.
U.S. Appl. No. 11/449,141 Final Office Action mailed May 27, 2010.
U.S. Appl. No. 11/449,141 Office Action mailed Dec. 15, 2009.
U.S. Appl. No. 11/449,141 Final Office Action mailed Aug. 6, 2009.
U.S. Appl. No. 11/449,141 Office Action mailed Feb. 6, 2009.
U.S. Appl. No. 11/449,141 Office Action mailed Sep. 15, 2008.
U.S. Appl. No. 11/725,175 Final Office Action mailed Dec. 9, 2009.
U.S. Appl. No. 11/725,175 Office Action mailed Jun. 3, 2009.
U.S. Appl. No. 12/352,590 Office Action mailed Feb. 1, 2011.
U.S. Appl. No. 13/098,470 Office Action mailed Aug. 1, 2013.
U.S. Appl. No. 13/098,470 Final Office Action mailed Aug. 6, 2012.
U.S. Appl. No. 13/098,470 Office Action mailed Feb. 22, 2012.
U.S. Appl. No. 13/252,150 Final Office Action mailed Dec. 17, 2012.
U.S. Appl. No. 13/252,150 Office Action mailed Jun. 7, 2012.
U.S. Appl. No. 12/917,642 Final Office Action mailed Jun. 12, 2013.
U.S. Appl. No. 12/917,642 Office Action mailed Mar. 11, 2013.
U.S. Appl. No. 12/917,642 Office Action mailed Nov. 5, 2012.
Examination Report for EP 07753269.5 mailed Aug. 19, 2015.
U.S. Appl. No. 12/917,642 Final Office Action mailed Mar. 25, 2016.
U.S. Appl. No. 14/101,870 Office Action mailed Apr. 22, 2016.
U.S. Appl. No. 15/391,616, filed Dec. 27, 2016, Adam P. Harris, Managing Game Metrics and Authorizations.
U.S. Appl. No. 12/917,642 Office Action mailed Jul. 28, 2016.

\* cited by examiner

INVALIDATING NETWORK DEVICES WITH ILLICIT PERIPHERALS

CROSS-REFERENCE TO RELATED APPLICATIONS

The present application is a continuation and claims the priority benefit of U.S. patent application Ser. No. 11/415,881 filed May 1, 2006, which will issue as U.S. Pat. No. 8,771,061 on Jul. 8, 2014, which is a continuation-in-part and claims the priority benefit of U.S. patent application Ser. No. 11/386,039 filed Mar. 20, 2006, now U.S. Pat. No. 7,480,656, the disclosures of which are incorporated herein by reference.

BACKGROUND OF THE INVENTION

Field of the Invention

The present invention relates, generally, to network gaming and more particularly to systems and methods for validating game users and devices in a networked community of game players.

Description of the Related Art

Conventionally, users of electronic games compete with one another by selecting a two-player option associated with a particular electronic game via a single home gaming console. Accordingly, two players can play at the same time or one-at-a-time in order to compete for points or other awards associated with the particular electronic game.

As electronic game consoles have become more popular and network technologies have become more pervasive, more options for head-to-head competition have become available. Some electronic game consoles are equipped with modems or other network connectors for allowing users to communicate over a network through the exchange of data related to the game. By communicating over a network, users can connect to various other users' gaming consoles either directly or via intermediate computing nodes (e.g., a central server or other game consoles in a network) and compete against those various other users while playing a network game.

Disadvantageously, some users manipulate the network game in order to gain unfair advantages while competing with other users playing the same network game. For example, a user may slow or delay the rate at which the user's data is sent to other users so that the various other users do not receive the user's data in time to react appropriately.

Unscrupulous users may employ an external hardware device that manipulates the generation of or access to certain game data whereby a game character may be endowed with special powers, abilities or attributes (e.g., lives, ammunition, and weapons) not genuinely earned during game play. Similarly, a game character may become impervious (e.g., invisible) to attacks by other game players.

Certain software methodologies exist (either alone or in conjunction with the aforementioned hardware devices) wherein code is temporarily or permanently installed and/or modified in a gaming device allowing for similar advantages. Various other means and methods are known and employed by users in order to cheat or gain an unfair advantage during the course of networked 'community' game-play.

Cheating decreases user enjoyment of participating in a networked community game environment. For example, a particular user playing a network game without any illicit outside aides (e.g., cheat codes, hacks, and so forth) is at a distinct disadvantage versus a user who is making use of such illicit aides. The user who is not cheating may be overpowered, outgunned, or otherwise inferior in some respect to a user who is cheating regardless of the individual skills of those users. If the user who does not cheat is continually defeated by a user who does cheat—and often in quick and decisive fashion-the non-cheating user may lose interest in a particular game, a particular game network, or a particular product or service provider.

This loss of interest adversely affects game developers and network service providers who will sell less game titles or find fewer users utilizing their network game services, respectively. As such, there is an inherent interest for game developers, service providers, and honest game users to identify and eliminate cheating in a network or community game environment.

SUMMARY OF THE PRESENTLY CLAIMED INVENTION

The present invention provides a system and method for passively validating network game users with respect to engaging in unfair or illicit game play (i.e., cheating).

According to one embodiment of the present invention, one or more users in a network game environment are monitored to determine whether unfair, illicit or otherwise disingenuous game play has occurred or is in progress as reflected by certain data generated by the user's gaming device. Data is received from the one or more users by a passive validation node. The received data is evaluated by the passive validation node to determine whether the one or more users are adhering to one or more rules associated with a network game or are engaged in the aforementioned unfair, illicit or otherwise disingenuous game play.

According to an additional embodiment of the present invention, a passive validation node will, after identifying the presence of unfair, illicit or otherwise disingenuous game play in the network as reflected by data generated by or residing at the user's gaming device, send or cause another node to send at least one query to the one or more users whose game play is in question. This query further determines and/or verifies whether unfair, illicit or otherwise disingenuous game play has occurred or is in progress as reflected by certain data residing at the user's gaming device. A response to the at least one query is received whereby it is determined whether the one or more users are valid users (i.e., not cheating). The response to the at least one query is indicative of the nature of game play in progress (i.e., whether the at least one user is engaged in unfair game play activity).

Various embodiments of the present invention allow for passive validation of network game users to occur through server observations, peer observations, peer-group observations or a combination thereof.

Additional embodiments of the present invention advantageously allow for identification of hacking or modification of game data stores or game console hardware through passive observation of gaming data passed through a network.

DETAILED DESCRIPTION

Figure 1:
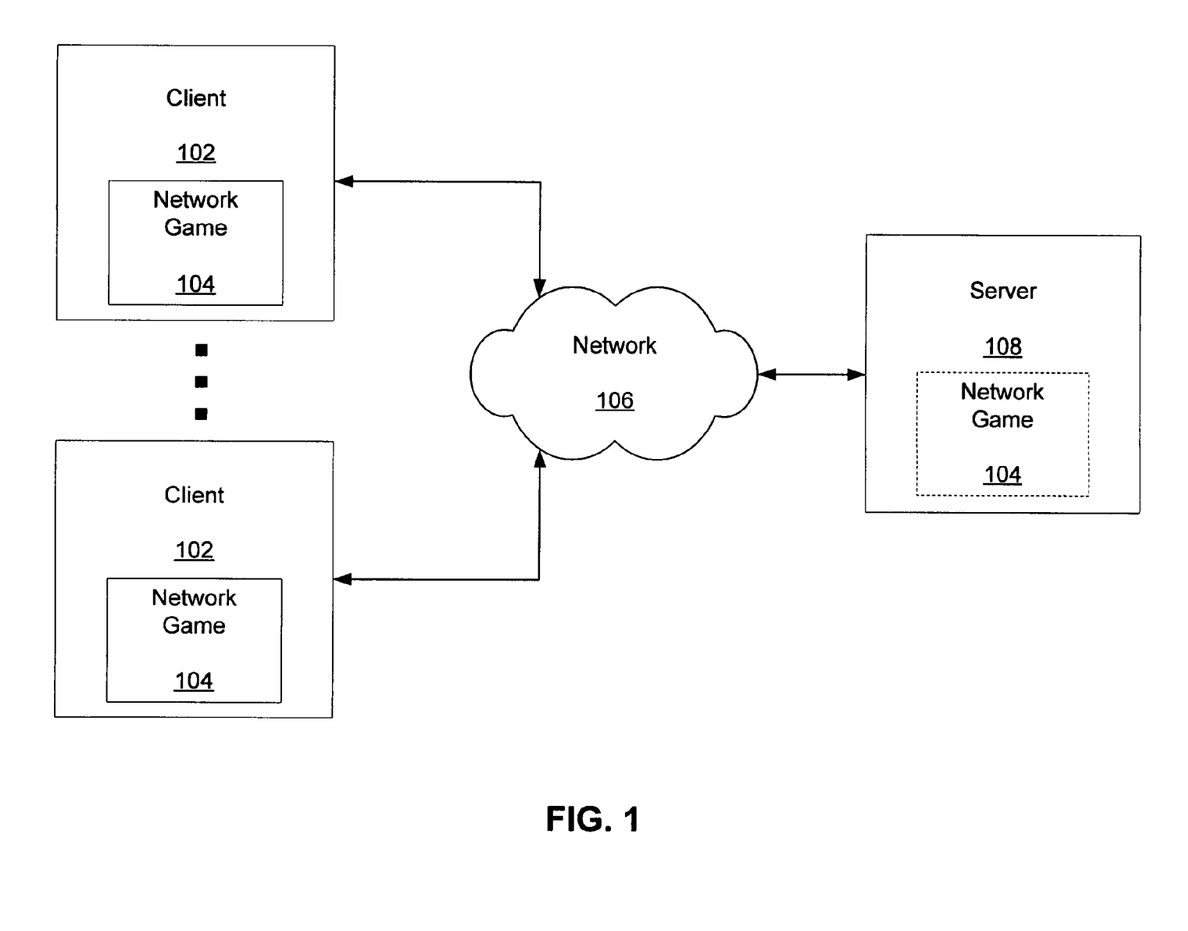
FIG. 1 illustrates a schematic diagram of an exemplary architecture for validating network users according to various embodiments of the present invention.

FIG. 1 illustrates a schematic diagram of an exemplary architecture for validating network game users according to various embodiments of the present invention. One or more clients 102 include one or more network games 104. Network game 104 may be built-in (e.g., pre-loaded) to the client 102 or be introduced through an optical disk or other data storage medium. Network game 104 may also be obtained over a network as further discussed herein. The client 102 is connected to a server 108 via a communications network 106.

The client may comprise 102 a game console such as a PlayStation® 3, a laptop computing device, a portable game device such as the PlayStation®. Portable, a desktop computing device, a cellular telephone, or any other device capable of executing the network game 104 and connecting to the network 106. In some embodiments, the client 102 is identified by an identification number such as a client ID or an address mechanism such as an IP address. In other embodiments, a user of the client 102 may 'sign on' to a network with a user name and/or password and may be temporarily or permanently associated with the client 102.

In some embodiments of the present invention, the server 108 includes the network game 104 and the clients 102 access the network game 104 on the server 108 via the network 106. The network game 104 on the server 108 may be the entire game, a portion of the game, data related to the game or simply a node allowing for the pass though, observation and/or collection of data related to the game 104 as the game 104 is played by users in the game community. The network game 104 may be similarly organized at various clients 102 (e.g., portions of the game or game data related to the game). Network game 104 may also be provided through, for example, a third-party content library server. In such an embodiment, the library server may or may not be a participating member of the validation architecture.

It should be understood that the reference to a client 102 and a server 108 is merely for the convenience of understanding the present invention. Embodiments of the present invention may be implemented in the context of a peer-to-peer network, a client-server network, or within a peer-group (e.g., a specified group of peers). Therefore, in some instances, a client may function as a server and vice versa depending on the timing and the nature of a data exchange. For example, various clients in a peer-to-peer network may each comprise a portion of a network game 104 or data related to that game 104 and may send and receive the same. As such, any reference to a client or a server is meant to be inclusive of operations performed by one or both entities unless specified otherwise by a particular limitation in the claims. In some instances, a device with client/server functionality may be referred to by the generic moniker, 'network node' or 'computing node.' In that regard, client 102 and server 108 may both be considered network or computing nodes.

The network game 104 comprises any software that may be processed on or by the client 102 and that allows for communication and data exchanges with the other clients 102 and server 108 via the network 106. The network 106 may include, for example, the Internet. Other proprietary or closed networks may be used either exclusively or in conjunction with the Internet. Certain security protocols (e.g., SSL or VPN) or encryption methodologies may be used to ensure the security of data exchanges over network 106, especially if the network 106 is a publicly accessible network such as the Internet.

Users associated with each of the clients 102 can interact with other users playing the network game 104. Accordingly, the users at each of the clients 102 can compete with one another despite not being physically present with one another or sharing a common gaming device or console.

In one exemplary embodiment, the server 108 monitors the users playing the network game 104 via the network 106. The clients 102 can request data from the server 108, such as information pertinent to the particular network game 104 being played, bug patches, and so forth. Any type of communication exchange between the clients 102 and the server 108 is within the scope of the various embodiments. Further, in some embodiments of the present invention, more than one server 108 may be connected to the network 106 for the purpose of communicating with the clients 102. For example, back-up or redundancy servers as well as servers with particular tasks such as storing identification information or preferences related to a particular user as well as servers tasked with certain DRM, advertising, or payment responsibilities.

In other embodiments of the present invention, the clients 102 monitor the network games 104 being played by the other clients 102 (e.g., as individual nodes in a peer-to-peer network or peer-group network). The clients 102 can communicate data generated during the monitoring process to the server 108 or the clients 102 can store and process the data, themselves. For example, in a peer-to-peer network scenario, each of the nodes in the network can monitor other nodes in the network for certain illicit behaviors.

The validation process implemented by the server 108, clients 102, and/or any one of a variety of nodes in the network detects cheating or unusual activity with respect to the network game 104. For example, a game character may accrue more points than allowed or normally allotted, the game character may possess stronger powers than the network game 104 generally provides, and so forth. Any type of unusual behavior or activity may be detected via the monitoring process discussed herein (e.g., passive validation), as result of random queries (e.g., active validation) or a combination of the two (e.g., hybrid validation).

Figure 2:
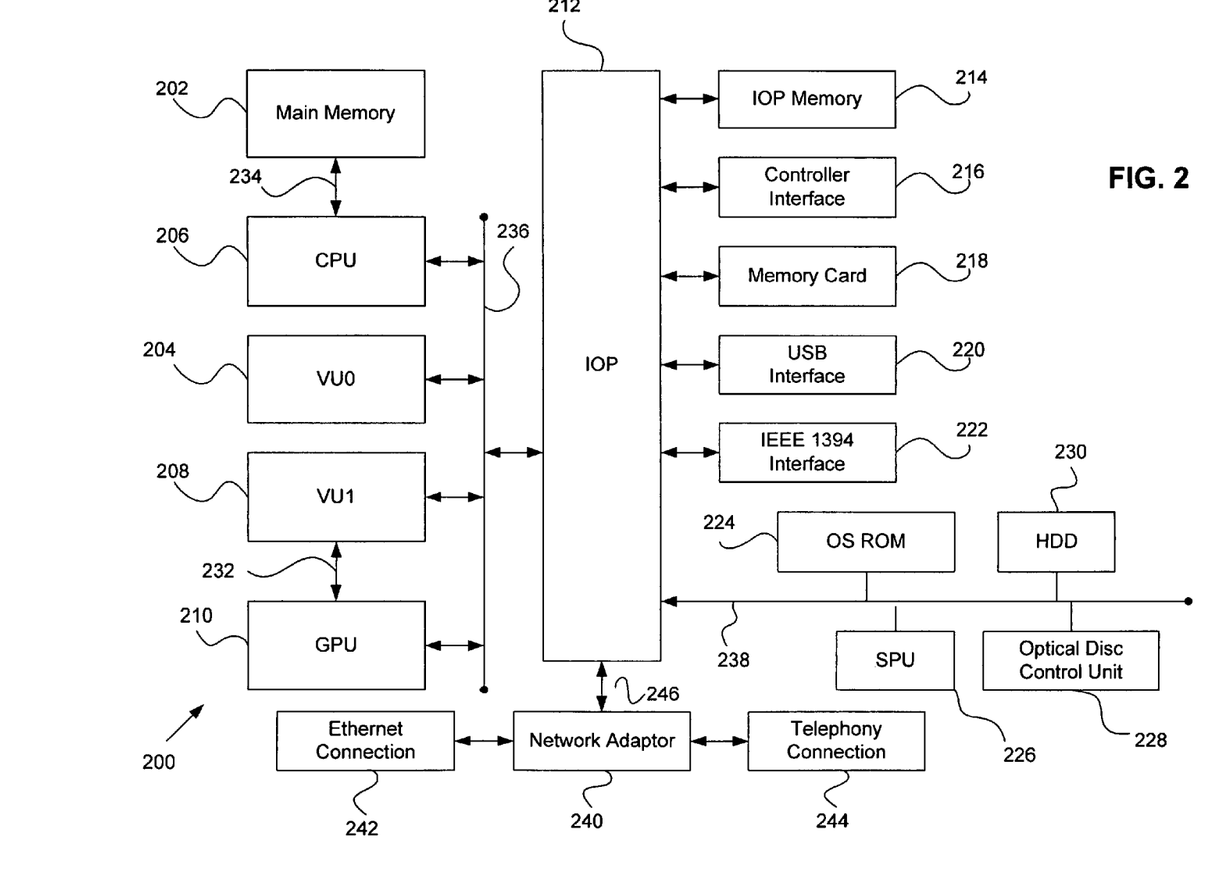
FIG. 2 illustrates a block diagram of an exemplary electronic entertainment system that may be utilized with certain embodiments of the present invention.

Referring now to FIG. 2, a block diagram of one embodiment of an exemplary electronic entertainment system 200, such as may constitute client 102 and for playing the network game 104 in accordance with one embodiment of the invention is shown. The system 200 may comprise, but is not limited to, a main memory 202, a central processing unit (CPU) 206, vector processing units VU0 204 and VU1 208, a graphics processing unit (GPU) 210, all of which may be coupled via a bus 236 to an input/output processor (IOP) 212. The system 200 may also comprise an IOP memory 214, a controller interface 216, a memory card 218, a Universal Serial Bus (USB) interface 220, and an IEEE 1394 interface 222. The system 200 may further include an operating system read-only memory (OS ROM) 224, a sound processing unit (SPU) 226, an optical disc control unit 228, and a hard disc drive (HDD) 230, all of which may be connected via a bus 238 to IOP 212.

Some embodiments of the system 200 may also include a network adaptor 240, which may offer an Ethernet connection 242 and/or telephony connection 244. The system 200 is, in one embodiment, an electronic gaming console; however, the system 200 (or portions thereof) may also be implemented as a general-purpose computer, a set-top box, a hand-held gaming device, or in a mobile device such as a cellular phone. It should further be noted that various other system architectures may be utilized within the scope of the present invention. For example, the computer architecture and high speed processing model disclosed in U.S. patent publication number 2002-0138637 for a "Computer Architecture and Software Cells for Broadband Networks," the disclosure of which is incorporated herein by reference.

The CPU 206, the VU0 204, the VU1 208, the GPU 210, and the IOP 212 communicate via a system bus 236. The CPU 206 communicates with the main memory 202 via a dedicated bus 234. The VU1 208 and the GPU 210 may also communicate with one another via a dedicated bus 232. The CPU 206 executes programs stored in the OS ROM 224 and the main memory 202. The main memory 202 may contain pre-stored programs and may also contain programs transferred via the IOP 212 from a CD-ROM, DVD-ROM, or other optical disc (not shown) using the optical disc control unit 228. The IOP 212 controls data exchanges between the CPU 206, the VU0 204, the VU1 208, the GPU 210 and other devices of the system 200, such as the controller interface 216, or from other such systems via the network adaptor 240.

The GPU 210 executes drawing instructions from the CPU 206 and the VU0 204 to produce images for display on a display device (not shown). The VU1 208 transforms objects from three-dimensional coordinates to two-dimensional coordinates, and sends the two-dimensional coordinates to the GPU 210. The SPU 226 executes instructions and processes data to produce sound signals that are output on an audio device (not shown).

A user of the system 200 provides instructions via the controller interface 216 to the CPU 206, which may be coupled to a control device comprising, for example, a joystick, directional buttons, and/or other control buttons. For example, the user may instruct the CPU 206 to store certain game information on the memory card 218, which may be removable (e.g., a flash memory or other non-volatile memory card), or may instruct a character in a game to perform some specified action. Other devices may be connected to the system 200 via the USB interface 220 and the IEEE 1394 interface 222, such as an external hardware device allowing for illicit gaming behavior (i.e., cheating).

Some embodiments of the system 200 may comprise a network adaptor 240. The network adaptor 240 provides the hardware functionality necessary for the system 200 to connect to a network. The network adaptor 240 may comprise, for example, a system connector that operates to connect the adaptor 240 to the system 200 through an expansion bus connector 246. The network adaptor 240 may also comprise a power connector and data connector to allow for the provisioning of power from the system 200 to the adaptor 240 and the exchange of data between the system 200 and the adaptor 240. In some embodiments of the present invention, the network adaptor 240 may also require the installation of certain software in the system 200 to allow for identification and connection to a particular IP address and/or dial-up to a particular Internet Service Provider. Software may also provide other functionalities, such as the creation and maintenance of user profiles, in addition to functional interaction between the system 200 and the network adaptor 240.

The network adaptor 240 may also comprise an Ethernet connection 242. Through the Ethernet connection 242, a network cable (e.g., a 100 Base-TX or 10-Base T) may be coupled to the network adaptor 240 for connection to a network. The network cable may, for example, be communicatively coupled to a DSL or cable modem. The network cable may also be communicatively coupled to, for example, a router via a LAN port; the router may then be coupled to a DSL or cable modem through a WAN port. In further embodiments, the Ethernet connection 242 may allow for a network cable to be connected to a wireless Ethernet bridge. The wireless Ethernet bridge may be communicatively coupled to a wireless router utilizing, for example, an 802.11x protocol. The wireless router may be further communicatively coupled to a cable or DSL modem.

The network adaptor 240 may also comprise a telephony connection 244. Through the telephony connection 244, a standard telephone line with, for example, an RJ-11C telephone connector may be connected to the network adaptor 240 and a telephone wall jack. In this regard, the network adaptor 240 may further comprise modem functionality such that the system 200 may communicate data over the public switched telephone network via the telephony connection 244.

Other network connection methodologies and system architectures may be implemented within the scope of the present invention. For example, those disclosed in commonly owned U.S. patent application Ser. No. 10/059,837 for a "System and Method for Distributing Data between a Telephone Network and an Entertainment Network," the disclosure of which is incorporated herein by reference.

Figure 3:
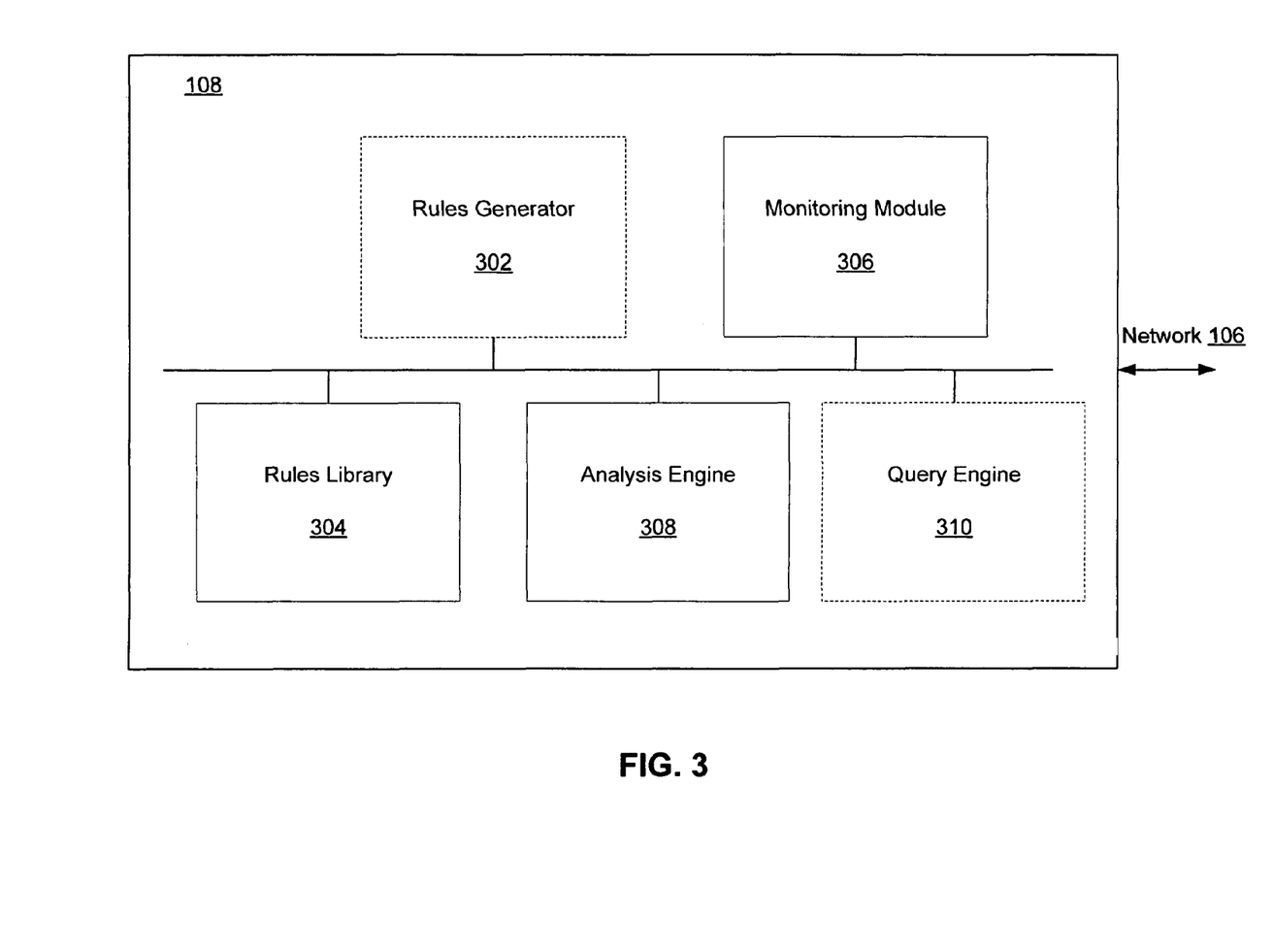
FIG. 3 illustrates an exemplary validation node according to one embodiment of the present invention.

FIG. 3 illustrates an exemplary validation node, such as the server 108 discussed in FIG. 1, according to one embodiment of the present invention. An optional rules generator 302 creates and/or processes rules associated with the network game 104. The rules may include, for example, parameters for a game environment. In some embodiments, the rules include, but are not limited to, appropriate character fatigue, speed, character strength, goals, power, ammunition, temporal variables, score ranges, prerequisites for advancement, frequency, and so forth. A rule may encompass any quantifiable limitation of the game environment or a character in the game environment (e.g., a user starting a game with ten lives when the game defaults to three).

Similarly, rules may encompass any identifiable aspect of the gaming environment or the hardware and/or software related to generating that environment. For example, the overwriting or modification of certain code in main memory 202, the presence of certain hardware devices with a particular device signature present in system 200 via USB Interface 220 or IEEE 1394 Interface 222 or the presence of certain data on a memory card 218 may be subject to a rule (e.g., prohibiting the presence of devices evidencing a particular signature). The receipt or presence of remnants of certain instruction threads including number, location or specific characteristics in, for example, main memory 202 or IOP memory 214 may also be subject to rules validation (e.g., cheating may not immediately be occurring but the presence of prior instruction threads related to cheating indicate cheating did at one point occur). The blocking of the transmission or receipt of particular data via network adaptor 240 may also constitute the basis for a rule (e.g., prohibitions of particular data transfers indicate cheating).

Rules are inclusive and may be independently generated by the optional rules generator 302 or otherwise related to data provided to the rules generator 302 (e.g., by a game developer). Optional rules generator 302, in this regard, may observe (e.g., through monitoring module 306) certain game parameters and develop a rule based on its observations of a particular network game 104. For example, the generator 302 may observe that gaining access to a particular level always requires meeting certain prerequisites. The generator 302 may develop a rule reflecting that if a user has achieved access to that particular level and has not met those prerequisites, that user is cheating. Those prerequisites may be observed by the generator 302 and/or related to information provided to the generator 302.

A rules library 304 is provided for storing the pre-defined or generated rules. Various other data may be stored in the rules library 304 according to some embodiments of the present invention. For example, statistics about one or more users of the network game 104 may be stored in the rules library 304, or any other storage medium or locale, according to some embodiments of the present invention. Alternative storage of statistics or other information may occur remotely from a network node but is otherwise accessible via the network 106. In some embodiments, the rules are directly input into the rules library 304 or may have been independently or cooperatively developed by the rules generator 302.

A monitoring module 306 may be configured to monitor user activity with the network game 104 at the client 102 via data exchanges with the server 108 via the network 106. Any type of monitoring may be implemented by the monitoring module 306 (e.g., periodic review of data exchanges, constant review of data exchanges, review of data exchanges from particular nodes, etc.). According to one embodiment of the present invention, the monitoring module 306 utilizes rules in the rules library 304 and analysis provided by the analysis engine 308 to passively listen for or detect user activity that deviates from typical user activity associated with the network game 104.

The data reviewed by monitoring module 306 may comprise normal game data generated in the course of game play. This may include data concerning position of a character, the number of lives remaining, the present score, and so forth. The data may alternatively or further comprise data specifically generated for the purposes of validation. This may include certain query response data, header data, encryption-related data, device status data and so forth.

Device status data may reflect the nature or identification of certain devices or peripherals coupled to client 102. The manufacturer of a particular network game 104 or client 102 may provide certain enhancement devices that, under certain circumstances (e.g., a special 'enhanced gamers' session) are permitted during the game play or that might have substantial uses not related to cheating. The devices may be configured to provide a device signature identified by the client 102 and communicated as a part of, for example, specifically generated validation data monitored by the monitoring module 306. Similarly, illicit devices may generate an unrecognized or unapproved signature (either directly or through certain interactions with the client 102 or network game 104) that subsequently causes the generation of validation data by the client 102 as part of a device status report received by monitoring module 306.

In some embodiments, the monitoring module 306 may be located in particular client nodes within the network. For example, a particular network game 104 (e.g., one distributed on a CD-ROM) may include certain aspects of a validation system and related software embedded with the game software. As such, any client 102 in the network 106 may possess validation functionality in addition to a server 108.

A client 102 with validation software (e.g., monitoring module 306) may operate by itself or may operate in conjunction with the server 108 to ensure valid game play in the network. Client 102, in one embodiment, may possess the monitoring module 306 and rules library 308 in addition to other possible aspects of the validation architecture illustrated in FIG. 3 through a particular network game 104 title. As such, the client 102 may observe another client 102 in the network. If the monitoring module 306 observes illicit behavior through a data exchange with another client 102 in the network 106 (as might be identified through particular rules in the rules library 304 and/or determinations by the analysis engine 308), the client 102 observing such illicit behavior may take certain action in response to the illicit behavior. Alternatively, the valid client may report the invalid client to the server 108 and the server 108 may engage in more detailed analysis of the purportedly illicit behavior through, for example, active queries as may be generated by a query engine 310. The server 108 may also engage in certain behavior designed to maintain the integrity of the gaming network such as dismissing the invalid client, overwriting invalid code through a pushed update, maintain a record of the invalid client and its related user and so forth. These various integrity maintenance actions may also be executed by client 102 (e.g., dismissals) or by client 102 in response to an instruction or request by the server 108.

By sharing and/or distributing validation responsibilities, bandwidth consumption and processing power of the server 108 is alleviated and possibly avoids the involvement of an additional computing device in the validation relationship. That is, one client 102 may validate another and vice-versa through the course of regular data exchanges instead of using the server 108 as a validating intermediary.

Validation may also occur amongst a plurality of clients 102 in the network 106. For example, a first client 102 may engage in monitoring for a particular period of time with those responsibilities then taken over by a second client 102 at a later time. By randomly reassigning monitoring responsibilities (e.g., via server 108), more adept cheaters that may be able to avoid detection by a single monitoring entity must now deal with a constantly random and reassigned monitoring entity or entities.

Certain embodiments may also make use of group validation wherein a particular client 102 must be validated by two or more other clients 102 in order for that client 102 to be deemed valid or invalid. Group validation may occur in conjunction with the server 108 whereby the server may take into account the validation information from the group of clients 102 and make an ultimate determination as to whether game play is allowed to continue for that particular client 102. One of the one or more clients 102 participating in the group validation may alternatively be assigned lead validation responsibility and take appropriate action in response to generated validation information. Leadership responsibilities may also be distributed amongst the members of the group wherein the group acts collectively or certain client 102 members of the group carry out designated responsibilities.

Reassignment of monitoring responsibilities may also make use of client 102 with idle processing and bandwidth. For example, a client 102 might be connected to the network 106 but is not actively playing a game 106 or is currently in a 'waiting room' or 'game lobby' awaiting entry into a particular game 106.

In alternative embodiments, a client 102 may download certain information from the server 108 such as rules or updates for the rules library 304 that may be only partially embedded with the game software of a network game 104. These updates or downloaded libraries may be temporarily stored in, for example, main memory 210 or a memory card 218. Rules updates or other related downloads may occur as a part of a regular schedule as determined by the server 108, as a part of a query by a client 102 to the server 108 for any variety of information, or during an initial log-on process wherein user names and passwords might be verified and that otherwise indicate the allowed permission of a particular user or client 102 in the network 106.

Rules may indicate how fast a character associated with the network game 104 can move. The monitoring module 306 may observe characters in the network game 104 moving in excess of that speed and may flag one or more characters that moves faster than the rules indicate is allowed for further investigation or resolution. The monitoring module 306 may (e.g., in hybrid validation architecture) independently activate the query engine 310 in light of this apparently illicit activity that suggests cheating and cause the query engine 310 to deliver a query to the apparently offending node to better determine whether the node is in a valid or invalid state.

Such activity is referred to a hybrid validation in that validation begins passively (i.e., no active query to the offending node) but upon identification of possible illicit behavior, a query, which is generally indicative of active validation, is delivered to the offending node for a more accurate determination of valid or invalid behavior. The combination of passive and active validation, together, constitutes hybrid validation.

In some embodiments (e.g., in passive validation architecture), the apparently offending node may be summarily removed from the network without further investigation. Alternatively, data pertaining to this apparently illicit activity may be logged for future use and/or analysis. Such activity is referred to as passive validation in that no proactive determination of validity is made; the determination occurs as a result of 'listening' to traffic (e.g., game play information) from the node.

The monitoring module 306, in some embodiments—including both passive and hybrid validation—may forward any flags or unusual activity to the analysis engine 308. The analysis engine 308 may analyze the flagged activity to determine whether the activity is, in fact, illegal with respect to the game environment constraints of the network game 104. In other words, the analysis engine 308 determines whether the user activity, in fact, violates the rules associated with the network game 104.

The monitoring module 306 receives data from the network game users as the network game users interact with the network game 104. For example, the client 102 may periodically post data to the server 108 or to the other clients 102 related to the network game 104 and/or the network game user's interaction with the network game 104. The monitoring module 306 reviews (e.g., 'listens to') the data as it is posted in order to determine whether the network game user associated with the client 102 that posts the data is cheating and/or failing to adhere to the one or more rules associated with the network game 104, as defined by the rules library 304. In an exemplary embodiment, the monitoring module 306 forwards the posted data to an analysis engine 308 and the analysis engine 308 analyzes and/or evaluates the posted data in light of rules from rules library 304 to determine whether the network game user 104 associated with the client 102 that posts the data is cheating and/or failing to adhere to the one or more rules associated with the network game 104.

For example, the network game user playing the network game 104 may play a nearly perfect game, such as achieving higher than usual scores. While, in many cases, this may be indicative of cheating, the user may simply be an above-average player. Data stored at the analysis engine 308, the rules library 304 or in another data storage locale or means (e.g., an ongoing record of particular game player activity and indicating an ongoing increase in quality of play over several sessions) may be utilized to make a determination whether this player is per se cheating or if further investigation via ongoing monitoring by the monitoring module 306 or, in the case of a hybrid validation scheme, a query from query engine 310 as described in FIG. 5 below.

Analysis engine 308 may also determine that while a user of a network game 104 presently has a particular advantage, this advantage may be one actually granted by the developer of the network game 104. For example, the game developer may have implanted an 'Easter Egg' or other 'hidden' functionality or bonus in the game environment such as temporary invincibility or excess speed. Certain bonus codes may also be recognized by the network game 104 and allow for game character or game environment enhancements. The analysis engine 308, through a query to the rules library 304, may determine that this particular behavior—while in any other context of the game would constitute cheating—is, in fact, permitted since the user has uncovered the Easter Egg or otherwise input an authorized code providing for such enhanced ability. The analysis engine 308 may also determine whether such enhanced functionalities have been disabled with regard to a particular network game environment and whether that activity, in light of that condition having been presently disabled, therein constitutes cheating.

In the case of a hybrid validation scheme, the analysis engine 308 and/or the monitoring module 306, may then instruct the query engine 310 to send one or more queries to the user's game device (system 200) in order to gather data that helps the analysis engine 308 determine whether the user activity qualifies as cheating. The query engine 310 may send predetermined queries for the particular network game 104 or the query engine 310 may generate specific queries for the network game 104 based on the user activity that is flagged by the monitoring module 306. The queries may or may not be directly related to the unusual behavior observed by the monitoring module 306. A more detailed discussion of the generation, delivery, and analysis of queries is found in co-pending U.S. patent application Ser. No. 11/386,039, which has previously been incorporated herein by reference.

If the analysis engine 308 determines that the user is cheating, the offending node may be ejected, allowed to continue playing, and so forth. In some embodiments, the server 108 or sending node may resolve the violation (i.e., cheating activity) whereby various types of resolution may be employed. In some embodiments of the present invention, the node tasked with resolving the behavior (e.g., server 108) may disable a cheating device or offending code presently running on the system 200 by sending a patch to remove, modify, or add to the offending software.

In some embodiments, the analysis engine 308 may generate a list of users or client devices 102 that violate the rules associated with the network game 104. In other words, the analysis engine 308 may generate a cheater 'rap sheet.' The cheating users may then be monitored more often by the monitoring module 306 according to some embodiments or employed as a variable for generating future rules by the optional rules generator 302.

In some embodiments, the client 102 may include certain or all of the components discussed in FIG. 3 with regard to server 108 whereby the device becomes more of a generic network node that may encompass server functionality, client functionality, both or neither (e.g., a router, buffer or intermediate point on a network). Accordingly, the client 102 can detect cheating activity occurring on other clients 102, as discussed herein. One node in the network may also observe other nodes in response to an initial request by a server 108.

Nodes, as referenced above, may also act in peer-groups whereby, for example, ten particular nodes constitute a group. Groups may be defined by the particular needs or nature of a particular network environment. For example, a group may constitute all players of a network game 104. A group may constitute all players of a network game 104 and participating via a particular ISP. A group may also constitute players in a certain 'game room,' that is, players that have been invited to participate with one another or otherwise entered a particular gaming environment of particular users. A group may be defined by any parameter that allows for delineation of one user from another (e.g., age, experience, game device being used, time logged on, type of network connection, bandwidth availability, etc.).

Other embodiments may provide for group participation in analysis of certain behavior. For example, multiple nodes (via monitoring module 306) may observe behaviors from a particular node. The behaviors observed may be identical or each involving different game behavior information. In some embodiments, an approval (e.g., validation) of same or varying behaviors as observed by various nodes may be required by all or a certain percentage of the observing nodes to further ensure the validity of the observed node in the community network.

Furthermore, although various components are discussed in connection with FIG. 3, the server 108 and/or the client 102 may include more or fewer components and still fall within the scope of various embodiments of the present invention. For example, responses to illicit behaviors may be carried out by a separate integrity module (not shown) in conjunction with or independent of, for example, analysis engine 308 as referenced above.

Figure 4:
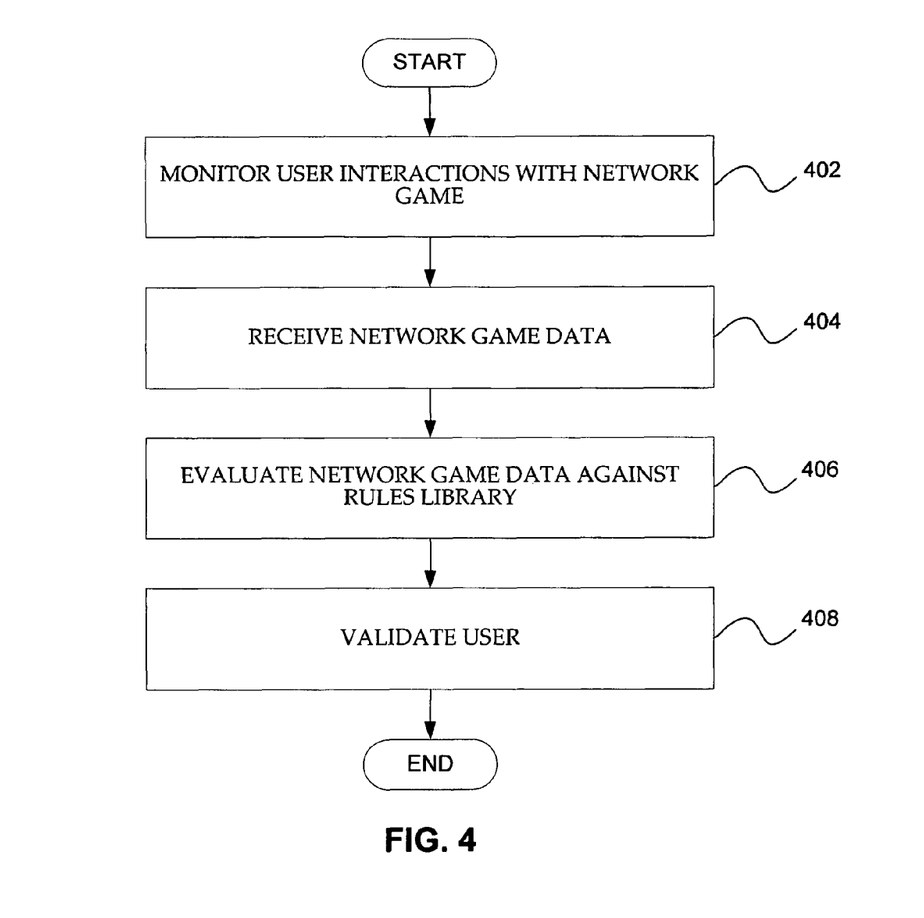
FIG. 4 illustrates a flow diagram of an exemplary process for passively validating network game users according to one embodiment of the present invention.

Referring now to FIG. 4, a flow diagram of an exemplary process for passively validating network game users according to various embodiments of the present invention is shown. At step 402, one or more users interacting with a network game in a network game environment are monitored. The network game, such as the network game 104 discussed in FIG. 1, may reside on the one or more clients 102 and/or on the server 108. As discussed herein, the one or more users may comprise the network game users. The monitoring module 306 may monitor the interaction among the network game users by observing activity and/or data via the network 106. For example, the monitoring module 306 may observe data transmitted from a first network game user to one or more second network game users, each associated with a client 102. In other embodiments, the data under observation may comprise the posting of a score or the saving of game data (e.g., progress in a game) at the server 108.

At step 404, data is received from the one or more users as a part of the aforementioned monitoring process. As discussed herein, the data may be received via the monitoring module 306 observing the network game users' interaction with the network game 104 and/or the data may be received as a result of the clients 102 posting data to the other clients 102 or the server 108. Any type of data may be received from the network game users according to exemplary embodiments.

At step 406, the data is evaluated to determine whether the one or more users adhere to one or more rules associated with the network game 104. The monitoring module 306 may flag unusual network game user activity or data posted by the client 102 either alone or in conjunction with the analysis engine 310. This data may be evaluated as the data is posted/received or sometime after the data is posted/received. For example, analysis may occur during a level change, during a game save, during the introduction of a new player or departure of a player to/from the community, while a particular player is in a game lobby or waiting room and so forth.

Utilizing the one or more rules associated with the network game 104, the data is evaluated to determine whether the network game user adheres to the rules while participating in the network game in step 406. For example, the one or more rules may indicate that the network game user participating in a sports game (e.g., a football game) may not be allowed more than three time-outs as to prevent a particular user an unfair advantage in plotting plays as the game advances. If the particular network game user posts data, or the data is otherwise observed, that indicates the particular network game user has used four or more time-outs, that user may be recognized as engaging in illicit (i.e., invalid) activity as the game user is presently failing to adhere to the rules defined by the particular network game 104 and/or rules library 304.

At step 408, the one or more users that adhere to the one or more rules associated with the network game 104 are validated. As discussed herein, validating the network game user may comprise recognizing the validated network game user as legitimate, as a non-cheater, and so forth. In some embodiments, the validated network game user may be monitored less frequently. In some embodiments, the network game users that are not "validated" are monitored more frequently than validated network game users. In yet other embodiments, the network game users that are recognized as cheaters based on failure to adhere to the rules associated with the network game 104 may be monitored more frequently, may be warned, and/or may be ejected from the network game 104. Any type of action or inaction based on validating the network game user is within the scope of various embodiments.

Figure 5:
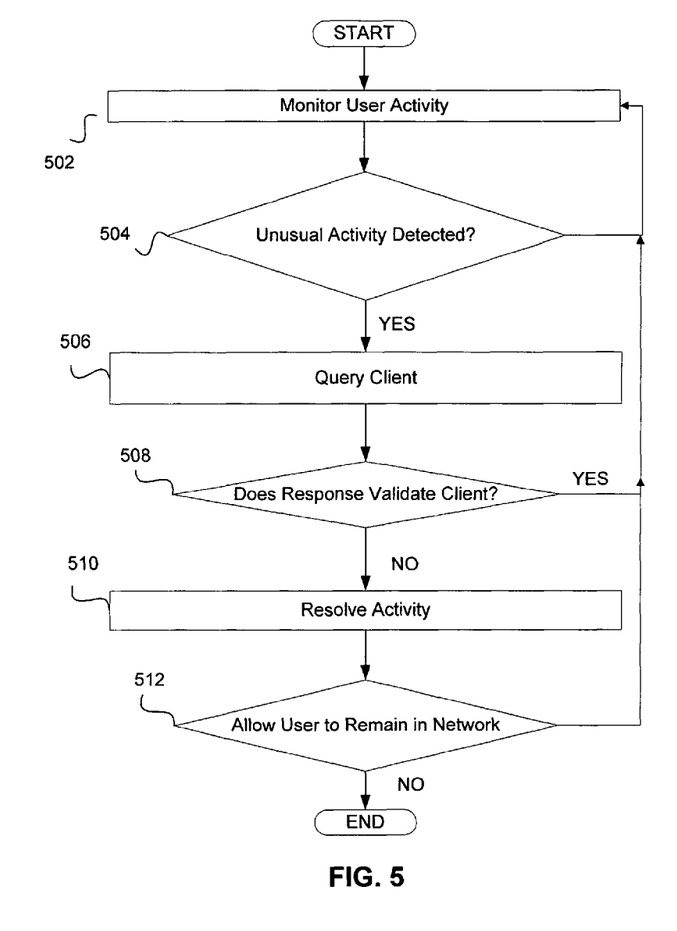
FIG. 5 illustrates a flow diagram of an exemplary process for validating network game users according to a hybrid validation scheme in accordance with one embodiment of the present invention.

FIG. 5 illustrates a flow diagram of an exemplary hybrid validation scheme according to various embodiments of the present invention wherein illegal game activity is identified. The illegal network game activity may include violation of the rules associated with the network game 104 or any other cheating activity by the network game users.

At step 502 network game play is monitored. The monitoring module 306 discussed in FIG. 3 monitors user activity associated with the network game 104.

At step 504, a determination whether there is anything unusual about a particular player's actions in the network game 104. If no unusual activity is detected, the monitoring module 306 continues to monitor the network game user's activities in the network game 104. This method is, in some respects, similar to the methodology set forth in FIG. 4. Unusual activity may constitute any activity that appears to violate a particular rule.

In the case of a hybrid validation architecture, however, if unusual activity is detected in step 504, the query engine 310 then sends a query to a client 102 (e.g., one associated with unusual activity) at step 506 in response to the monitoring module's 306 identification of illegal behavior, which might occur in conjunction with analysis engine 308. Based on the response to the query, the analysis engine 308 then further determines whether the unusual activity is illegal at step 508. If the node (e.g., client 102) is validated, monitoring module 306 continues to monitor activity of nodes like client 102 in the network.

If the node (e.g., client 102) is not validated, certain illegal activity may be resolved at step 510. Various resolutions may be employed, such as sending software to the node to add to, modify, or remove the offending code, warning the user at the offending node, creating a watch list concerning the offending client/user, and so forth.

At step 512, the server 108 or, in a peer-to-peer or group-peer scenario, the clients 102, determine whether to allow the network game user to continue to play in the network. If the network game user is allowed to continue to play, the node remains subject to future queries and/or monitoring in active, passive or hybrid validation architectures as is appropriate. If the network game user is not allowed to continue, the server 108 or the other clients 102 can eject the network game user, such as by ceasing data communication with the particular network game user. In some embodiments, the network game user that is not allowed to continue participating in the network game 104 is notified that the network game user is being ejected. In yet another embodiment, the network game user may be denied future participation in a particular network game or, in extreme cases, may be denied access to the gaming network or community.

While various embodiments have been described above, it should be understood that they have been presented by way of example only, and not limitation. For example, any of the elements associated with the client 102, the network game 104, and/or the server 108 may employ any of the desired functionality set forth hereinabove. Thus, the breadth and scope of a preferred embodiment should not be limited by any of the above-described exemplary embodiments.

The present invention may also be used in the context of validating certain permissions and/or copyright protections that may exist with regard to copyrighted content. Content may be validated through a query to verify whether a particular party or device has the authority to 'play' that content.

Further, the present invention may be used in the context of providing updates to various computing devices wherein it is determined that a portion of software is out-of-date and in need of updating or overwriting.

The present invention may be further implemented in a common network game 104 that is operable over a mixed network of end user devices (e.g., clients 102). For example, one client device 102 may be a personal computer; a second client device 102 may be a home entertainment system such as a PlayStation® 2 or PlayStation® 3 available from Sony Computer Entertainment Inc. Another client device 102 may be a portable gaming device such as a PSP® (also from Sony Computer Entertainment Inc.) whereas a fourth client 102 may be a home entertainment system of a different manufacture such as an Xbox as manufactured by Microsoft Corporation or a GameCube as manufactured by Nintendo Co., Ltd. The present anti-cheat methodologies described herein are fully intended to be operable amongst a related or non-related group of devices.

What is claimed is:

1. A method for validating use of peripheral devices in a network, the method comprising:

storing information in memory regarding a plurality of peripheral device signatures, wherein a set of peripheral device signatures is identified as acceptable and another set of peripheral device signatures are identified as illicit;

receiving data at a server, wherein the received data is generated by one or more computing devices as part of network interaction between the computing device and a network, and wherein each computing device includes one or more peripheral devices;

monitoring the received data from the one or more computing devices at the server, wherein the received data includes peripheral device data associated with each computing device, and wherein the monitoring does not require the one or more computing devices to execute instructions specifically for validation of peripheral devices associated with the computing devices;

comparing the monitored data with stored rules associated with the network, wherein the stored rules identify acceptable parameters regarding network gameplay, and wherein acceptable parameters specify acceptable peripheral devices;

identifying that peripheral device data associated with one of the computing devices includes a device signature of an illicit peripheral device when the comparison of the monitored data indicates that the peripheral device data of the identified computing device is not recognized as a device signature of an acceptable peripheral device; and invalidating the identified computing device from further network interactions based on the identified use of the illicit peripheral device.

2. The method of claim 1, wherein the monitoring is performed via passive validation, active validation or a combination of both passive and active validation processes.

3. The method of claim 1, wherein the network corresponds to a network game.

4. The method of claim 3, wherein the generated rules corresponds to rules associated with the network game environment.

5. The method of claim 1, wherein the generated rules further include rules provided by a third party associated with the network.

6. The method of claim 1, wherein the identifying of the particular computing device includes evaluating information obtained from a group of two or more distinct client computing devices pertaining to the particular computing device, and wherein the evaluated information indicates that the group of two or more distinct client computing devices invalidates the particular computing device.

7. A system for validating use of peripheral devices in a network, the system comprising:

one or more computing devices, wherein each computing device includes one or more peripheral devices;

a server that receives data, wherein the received data is generated by one or more computing devices as part of network interaction between the computing device and a network; and a monitoring module that executes instructions stored in memory to:
   store information in memory regarding a plurality of peripheral device signatures, wherein a set of peripheral device signatures is identified as acceptable and another set of peripheral device signatures are identified as illicit
   monitor the received data from the one or more computing devices at the server, wherein the received data includes peripheral device data associated with each computing device, and wherein the monitoring does not require the one or more computing devices to execute instructions specifically for validation of peripheral devices associated with the computing devices;
   compare the monitored data with stored rules associated with the network, wherein the stored rules identify acceptable parameters regarding network gameplay, and wherein acceptable parameters specify acceptable peripheral devices,
   identify that peripheral device data associated with one of the computing devices includes a device signature of an illicit peripheral device when the comparison of the monitored data indicates that the peripheral device data of the identified computing device is not recognized as a device signature of an acceptable peripheral device, and
   invalidate the identified computing device from further network interactions based on the identified use of the illicit peripheral device.

8. The system of claim 7, wherein the monitoring is performed via passive validation, active validation or a combination of both passive and active validation processes.

9. The system of claim 7, wherein the network corresponds to a network game.

10. The system of claim 9, wherein the generated rules corresponds to rules associated with the network game environment.

11. The system of claim 7, wherein the generated rules further include rules provided by a third party associated with the network.

12. The system of claim 7, wherein the identifying of the particular computing device includes evaluating information obtained from a group of two or more distinct client computing devices pertaining to the particular computing device, and wherein the evaluated information indicates that the group of two or more distinct client computing devices invalidates the particular computing device.

13. A non-transitory computer readable storage medium, having embodied thereon a program executable by a processor to perform a method for validating use of peripheral devices in a network, the method comprising:
   storing information in memory regarding a plurality of peripheral device signatures, wherein a set of peripheral device signatures is identified as acceptable and another set of peripheral device signatures are identified as illicit;
   receiving data at a server, wherein the received data is generated by one or more computing devices as part of network interaction between the computing device and a network, and wherein each computing device includes one or more peripheral devices;
   monitoring the received data from the one or more computing devices at the server, wherein the received data includes peripheral device data associated with each computing device, and wherein the monitoring does not require the one or more computing devices to execute instructions specifically for validation of peripheral devices associated with the computing devices;
   comparing the monitored data with stored rules associated with the network, wherein the stored rules identify acceptable parameters regarding network gameplay, and wherein acceptable parameters specify acceptable peripheral devices;
   identifying that peripheral device data associated with one of the computing devices includes a device signature of an illicit peripheral device when the comparison of the monitored data indicates that the peripheral device data of the identified computing device is not recognized as a device signature of an acceptable peripheral device; and
   invalidating the identified computing device from further network interactions based on the identified use of the illicit peripheral device.

14. The non-transitory computer readable storage medium of claim 13, wherein the monitoring is performed via passive validation, active validation or a combination of both passive and active validation processes.

15. The non-transitory computer readable storage medium of claim 13, wherein the network corresponds to a network game.

16. The non-transitory computer readable storage medium of claim 15, wherein the generated rules corresponds to rules associated with the network game environment.

17. The non-transitory computer readable storage medium of claim 13, wherein the generated rules further include rules provided by a third party associated with the network.

18. The non-transitory computer readable storage medium of claim 13, wherein the identifying of the particular computing device includes evaluating information obtained from a group of two or more distinct client computing devices pertaining to the particular computing device, and wherein the evaluated information indicates that the group of two or more distinct client computing devices invalidates the particular computing device.

19. The method of claim 1 further comprising generating rules that characterize user activity and game parameters based on the monitored data, wherein the generated rules identify user activity that deviates from typical user activity for a game title associated with the user activity, and wherein the generated rules are stored in memory.

20. The method of claim 1, wherein the set of peripheral device signatures identified as acceptable or illicit is specific to a game title, and wherein a different game title is associated with a different set of peripheral device signatures identified as acceptable or ilicit.

* * * * *